METHOD OF MAKING A PN JUNCTION DEVICE

Filed June 17 1970 3 Sheets-Sheet 1

TAKESHI SAKURAI
ZENPEI TANI
*INVENTORS*

BY Flehr, Hohbach, Test, Albritton and Herbert
ATTORNEYS

METHOD OF MAKING A PN JUNCTION DEVICE

Filed June 17, 1970 3 Sheets-Sheet 2

TAKESHI SAKURAI
ZENPEI TANI
INVENTORS

BY Flehr, Hohbach, Test, Albritton and Herbert
ATTORNEYS

METHOD OF MAKING A PN JUNCTION DEVICE

Filed June 17, 1970 3 Sheets-Sheet 3

TAKESHI SAKURAI
ZENPEI TANI
*INVENTORS*

BY Flehr, Hohbach, Test,
Albritton and Herbert
ATTORNEYS

United States Patent Office 3,676,228
Patented July 11, 1972

3,676,228
METHOD OF MAKING A P-N JUNCTION DEVICE

Takeshi Sakurai, Hyogo-ken, and Zenpei Tani, Osaka, Japan, assignors to Sharp Kabushiki Kaisha, Osaka, Japan Filed June 17, 1970, Ser. No. 47,031
Claims priority, application Japan, June 20, 1969, 44/49,181, 44/49,185
Int. Cl. H01l 7/38
U.S. Cl. 148—171 9 Claims

ABSTRACT OF THE DISCLOSURE

Method of making P-N junction device which uses the liquid phase epitaxial growth technique in which elements of Group IV are employed as amphoteric impurities for semiconductors of compounds of Groups III–V. The growth cooling rate is changed to grow N-type and P-type layers successively on the substrate.

BACKGROUND OF THE INVENTION

This invention relates to a method of making P-N junction devices, and more particularly to an improved method of making P-N junctions on semiconductors of compounds by liquid phase epitaxial growth process.

Liquid phase epitaxial growth has found important applications in the manufacture of silicon, Si, doped gallium-arsenide, GaAs, light-emitting diodes and the like. The manufacture of Si doped GaAs light-emitting diodes is generally carried out in an electric furnace with a quartz or graphite boat. A GaAs wafer is positioned at one end of the graphite boat, the melt of gallium, Ga, GaAs source and Si dopant being placed at the other end. When the temperature reaches a predetermined temperature, the furnace is tipped to cause the melt to flow and contact the GaAs wafer surface. The prescribed temperature is held for a few minutes and cooling is carried out at a given rate of temperature decrease.

It is generally known that elements of Group IV act as amphoteric impurities for semiconductors of compounds of Groups III–V and such elements transfer their action from donors to acceptors at a certain temperature (hereinafter referred to as "transition temperature") during the epitaxial growth from liquid phase. The same applies to Si and GaAs. At high As pressure (high temperature), Si is apt to enter a Ga site so that a N-type layer grows and at low As pressure (low temperature), Si is apt to enter an As site so that a P-type layer grows. By the above temperature operation, a GaAs source is dissolved in the melt in the temperature increasing process and supersaturated in the cooling process. At high temperature Si enters the Ga site, N-type GaAs is precipitated on a GaAs substrate and recrystallized so that an N-layer grows; at temperatures below the transition temperature P-type GaAs grows and consequently a P-N junction is formed by the layers deposited on the substrate.

According to the conventional liquid phase growth process, the As pressure dominating the conductivity type of growth layers in Si doped GaAs was considered as a function of temperature alone. Accordingly, cooling from the predetermined temperature was made at a given rate to make a P-N junction. The transition temperature was considered to exist at only one point. Furthermore, the conductivity type of growth layers was considered to transfer from N-type to P-type but not to transfer from P-type to N-type during the cooling process. Although the conventional liquid phase epitaxial growth was useful for making light-emitting diodes, the above mentioned lack of adaptability to transfer from P-type to N-type, or to grow three or more layers, places large restrictions on applications of liquid phase growth process for semiconductor devices.

The field of optoelectronics is a unique branch which concerns directly future products such as light communication systems, light computers and solid state image converters. At this time the negative resistance light-emitting diodes have been spotlighted in this field. The negative resistance light emitting-diodes are generally made of semiconductor devices having high band gap energy and multi-layer structure such as 3-layer PPON and 4-layer PNPN. The conventional liquid phase process may make two growth layers at best and cannot make multi-layer structure devices with ease. In the case of manufacturing 4-layer devices, it is necessary to repeat at least two growth operations and it is, therefore, difficult to make. For practical purposes, it is impossible to manufacture negative resistance light-emitting diodes of multi-layer structure since the growth layers are extremely thin layers and these layers are exposed to an atmosphere of high temperature during the second operation.

On the other hand, in theory the conventional liquid phase growth process may make GaAs transistors but the obtained transistors are limited to that of the PNP type. In NPN transistors, mobility of electrons operative as carriers therein is higher than that of holes and this means that NPN type transistors have excellent properties in high frequency characteristics. However, it is impossible to manufacture NPN type transistors by the use of the conventional liquid phase epitaxial growth process.

OBJECTS AND SUMMARY OF THE INVENTION

Accordingly, the primary object of this invention is to provide an improved liquid phase epitaxial growth method which avoids one or more of the disadvantages and limitations of prior art methods of making P-N junction devices.

Another object of this invention is to provide an improved liquid phase epitaxial growth method which can obtain successively P-type and N-type layers in either order (N-type→ P-type, or P-type→N-type) for making P-N junction devices.

Still another object of this invention is to provide an improved liquid phase epitaxial growth method which can make multi-layer semiconductor devices in only one growth process.

A further object of this invention is to provide an improved epitaxial growth method which can make multi-layer semiconductor devices by the use of only one dopant.

It is still a further object of this invention to provide an improved method which can make negative resistance light-emitting diodes having high band gap energy with ease.

Another object of this invention is to provide an improved method which can make NPN type transistors in which electrons act as carriers.

An additional object of this invention is to provide an improved method which can give good yield in the case of manufacturing conventional light-emitting diodes not having negative resistance characteristics.

In summary, this invention refers primarily to improved methods of making P-N junction devices using liquid phase epitaxial growth with a melt including an amphoteric impurity which includes the step of changing the rate of temperature decrease during cooling of the melt so that P-type layers and N-type layers grow selectively and successively thereby forming a P-N junction between P-type and N-type layers.

Further details will be apparent from the following explanation of examples of embodiments of this invention with reference to the accompanying drawings.

DESCRIPTION OF THE PREFERRED EMBODIMENTS

Figure 1:
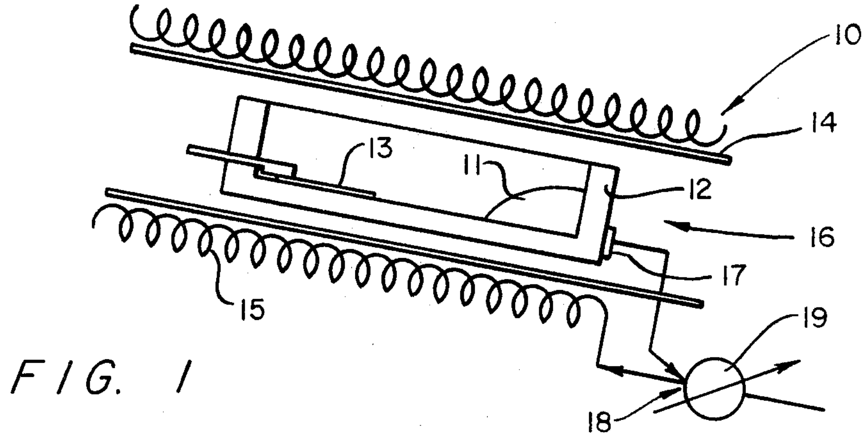
FIG. 1 is a schematic drawing of apparatus useful in the practice of this invention.

A furnace apparatus 10 for growing N-type and P-type semiconductor layers is schematically shown in FIG. 1. Ga, gallium, is used as a solvent for the materials. A melt 11 consisting of gallium, Ga; gallium arsenide, GaAs and silicon, Si, dopant is employed for the growth of P-type and N-type epitaxial GaAs layers. The melt 11 is positioned at one end of a graphite boat 12. The GaAs substrate 13, which may be either P-type or N-type or intrinsic, is placed at the other end. The furnace tube 14 is tipped at an angle such that the melt 11 and the substrate 13 are separated. Heater 15 is arranged around the furnace tube 14 and serves to heat the boat 12, substrate 13 and melt 11. In order to maintain a non-oxidizing atmosphere around the wafer 13 and the melt 11, the furnace tube 14 is swept or purged with pure hydrogen gas 16. The graphite boat 12 is brought to temperature and then the melt 11 and the substrate 13 are heated to a temperature above the melting point of the solvent, Ga. When the furnace temperature reaches a predetermined temperature in which the melt is formed, the furnace 12 is tipped in the opposite direction to allow the melt to flow over the GaAs substrate 13 and then the predetermined temperature is maintained for a predetermined time. The power source for the furnace is switched off and cooling of the furnace is allowed to continue at a certain rate. The GaAs source dissolved in the Ga solvent becomes supersaturated in the cooling process and precipitates from the melt. This results in an epitaxial growth on the substrate. Since Si is used as an amphoteric impurity, at a high temperature an N-type layer grows and at a temperature below the transition temperature a P-type layer grows.

Using the above furnace apparatus, various studies of liquid phase epitaxial growth were made in order to clarify conditions of Si actions as donors and acceptors. It was found that the transition temperature where the growth layer is converted from an N-type layer to a P-type layer varies according to the speed or rate of temperature decrease. This meant that As pressure can be controlled by the factor other than temperature, such as rate of temperature decrease. Based on these studies, it became clear that As pressure is a function of temperature and the degree of supersaturation of As. Further, the degree of supersaturation relates to the rate of temperature decrease.

Since the transition temperature is determined in the cooling process by As pressure, it may be also understood that if the temperature decreases from the predetermined temperature slowly within a certain range of rates of temperature decrease, the transition temperature becomes higher, and if the temperature decreases quickly, the transition temperature becomes lower.

Figures 2, 3, 4:
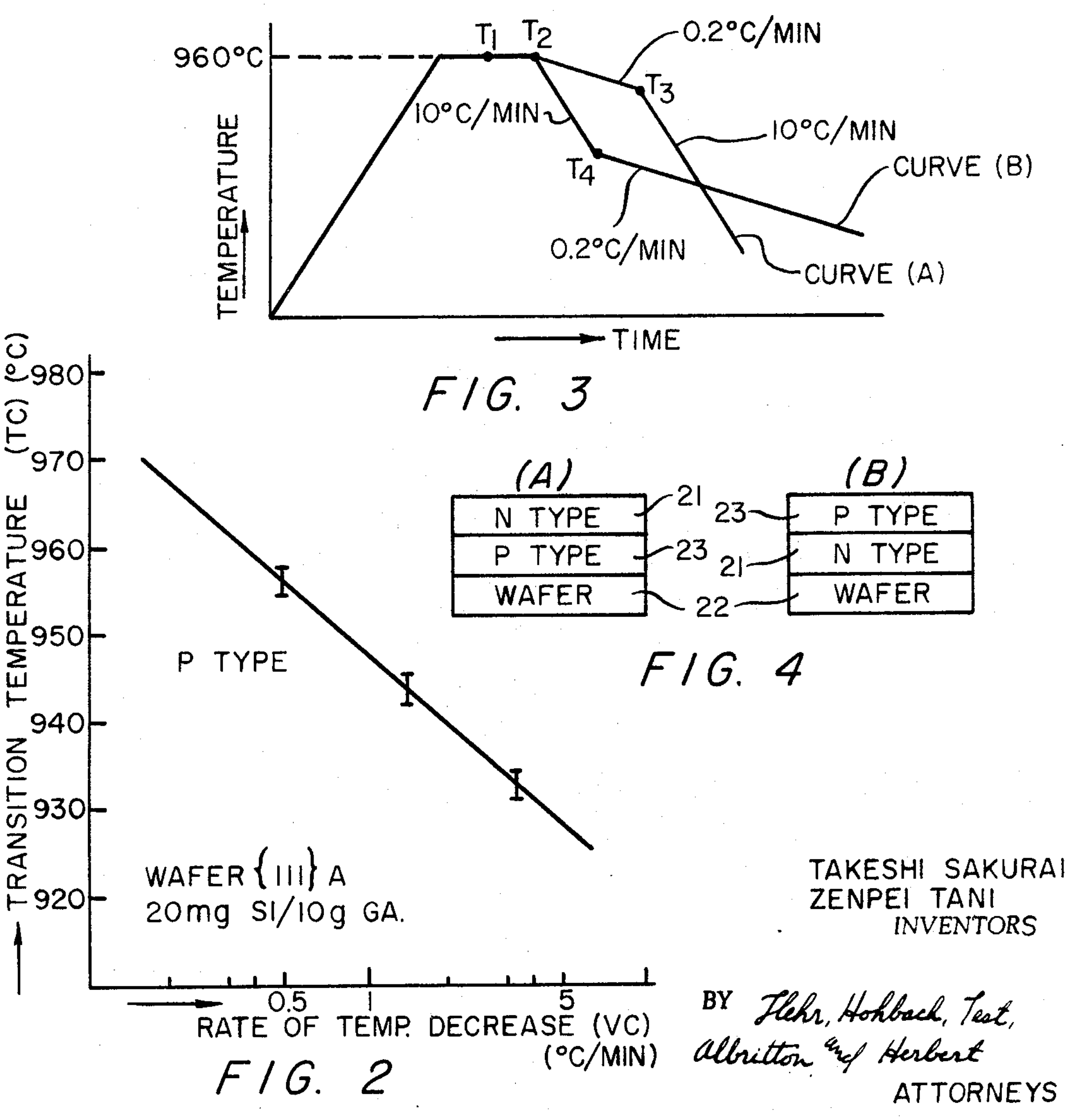
FIG. 2 is a diagram showing the relationship between the rate of temperature decrease and the transition temperature obtained by experimental results.
FIG. 3 is a program chart of the furnace temperature of examples of this invention.
FIG. 4 is a model drawing showing the layers grown by the methods shown in FIG. 3.

FIG. 2 shows the relationship between the temperature decreasing rate $Vc$ and the transition temperature $Tc$. The conditions for epitaxial growth are as follows: Ga solvent; 10 g.; GaAs source; 2.6 through 3.2 g.; Si dopant; $20\pm0.5$ mg., the crystal plane; [111]A. In these experiments an empirical formula is obtained as below:

$$Vc=\exp\ (115.5\ \times 10^3/Tc-94.56)$$

In addition, when the epitaxial growth layer is allowed to grow on the substrate surface other than the plane [111]A, e.g. plane [100], $\overline{[111]}$B, the temperature was different but the same results were obtained. The same results were obtained in the case of using Si of $5\pm0.25$ mg. for Ga of 10 g.

If, for example, the liquid phase epitaxy is allowed to grow at the rate of temperature decrease of 5° C./min., at temperatures below 950° C., the conductivity type of the growth layer changes from N-type to P-type and if it is allowed to grow at the rate of temperature decrease of 0.2° C./min., at temperatures over 960° C. such changing occurs. It is clear that the relationship shown in FIG. 2 changes depending on various factors such as the substrate crystal plane used as growth surface, additional amount of impurity, the temperature distribution in the furnace, etc. Such relationship within a certain range of rate of temperature decrease, e.g. within the range of about 0.1–10° C./min. has a rightward falling tendency as seen in FIG. 2. It is also clear that due to the above tendency, if the rate of temperature decrease is made low, a P-type layer grows; if the cooling speed is made high, an N-type layer grows, and if the rate of temperature decrease is left as it is, an N-type layer grows first and then a P-type layer grows.

A unique phenomenon as mentioned hereinbefore will be understood from the following theoretical explanation. Si is an amphoteric impurity for GaAs and, therefore, it acts as donor when substituted for atom Ga of GaAs and acts as acceptor when substituted for atom As. Whether Si is apt to enter a Ga site or an As site is considered to be determined by the As concentration at the liquid-solid interface during liquid phase of the growth process. The relationship shown in FIG. 2 will be interpreted as follows. It is well known that the lattice vacancies of Ga and As occur in the GaAs layers grown by liquid phase epitaxial growth. Now, compare a case of higher cooling speed ($Vc$) with a case of lower speed. The higher the cooling speed ($Vc$), the larger the degree of supercooling and the higher the As concentration at the liquid-solid interface. The concentration of As vacancies in the growth layer, therefore, becomes lower in proportion to the increase of cooling speed.

$$Si+[VAs]\rightleftarrows[SiAs]$$
$$Si+[VGa]\rightleftarrows[SiGa]$$
$$[SiAs]/[VAs]=K1\alpha Si$$
$$[SiGa]/[VGa]=K2\alpha Si$$

[VAs]: the concentration of As vancancies
[VGa]: the concentration of Ga vancancies
[SiAs]: the Si concentration in As site
[SiGa]: the Si concentration in Ga site
K1, K2: chemical equilibrium constants
$\alpha$Si: the Si concentration in Ga melt Since the concentrations [SiAs] and [SiGa] are determined by following the above chemical equilibrium formulae, the increase or decrease of the concentration [VAs] corresponds to that of the concentration [SiAs]. With higher cooling speed, one has lower concentration of [VAs] and higher concentration of [VGa]. Furthermore, the lower the concentration of [SiAs], the higher that of [SiGa]. Such conditions develop a tendency which favors the growth of an N-type layer. It is, therefore, made clear that if the cooling speed is higher, the N→P transition point shifts to the lower side along the temperature axis.

Referring again to FIG. 1, means for varying the temperature decrease speed is required to utilize the relationship as shown in FIG. 2. The thermocouple 17 cooperates with the wall of the graphite boat 12 so that it can observe an actual temperature of the furnace graphite boat and tube 14. The output of the thermocouple 17 is used as the control signal applied to controller 19 which varies the cooling speed. Reference input signal 18 is used to establish a predetermined temperature program. The current controller 19 is connected to control the current to the heater 15 responsive to the input signals. The current through the heater 15 is controlled according to the difference between the actual temperature and the programmed temperature. Accordingly, the actual temperature of the furnace follows the programmed temperature and thus the cooling speed varies according to the predetermined program.

Thus, P-N junction devices are made by liquid phase epitaxial growth process in which changing the rate of temperature decrease, P-type and N-type layers are optionally grown on a GaAs substrate.

FIG. 3 shows a program chart of the furnace temperature for making P-N junction devices by the use of the above relationship. This drawing indicates two kinds of the states of programming the furnace temperature as shown by curves A and B. In both methods, the furnace temperature is increased to the maximum holding temperature of 960° C. by the heater 15 and then the temperature is held for a few minutes.

As the time, $t_1$, the Ga melt 11 is flowed over the substrate 13 by tipping the furnace tube 15. At time, $t_2$, cooling of the furnace 14 begins. According to the first method shown by curve A, the furnace temperature is lowered at the low cooling rate of 0.2° C./min. During this time a P-type layer grows on the substrate. At time, $t_3$, the cooling speed changes to the higher rate of 10° C./min. and an N-type layer grows on the P-type layer.

According to the second method shown by curve B, the furnace temperature is lowered first at the high cooling speed of 10° C./min. and then lowered at the lower cooling speed of 0.2° C./min. In this case, an N-type layer is first grown and then a P-type layer is grown. The temperature programming is accomplished by combination of the thermocouple 17 and the current controller 19 as previously described.

FIG. 4 shows the layers and devices grown by the methods as shown in FIG. 3. In this drawing, section A shows a cross-section of a semiconductor device made according to the temperature process shown by curve A in FIG. 3, and section B shows the semiconductor device made according to the process shown by curve B. The higher cooling speed gives rise to growing N-type layer 21 on the semiconductor wafer 22 and the lower cooling speed gives rise to growing P-type layer 23. It is noted that the method mentioned hereinbefore can obtain successively P-type and N-type layers in either order. (N-type →P-type, or P-type→N-type).

Figure 5:
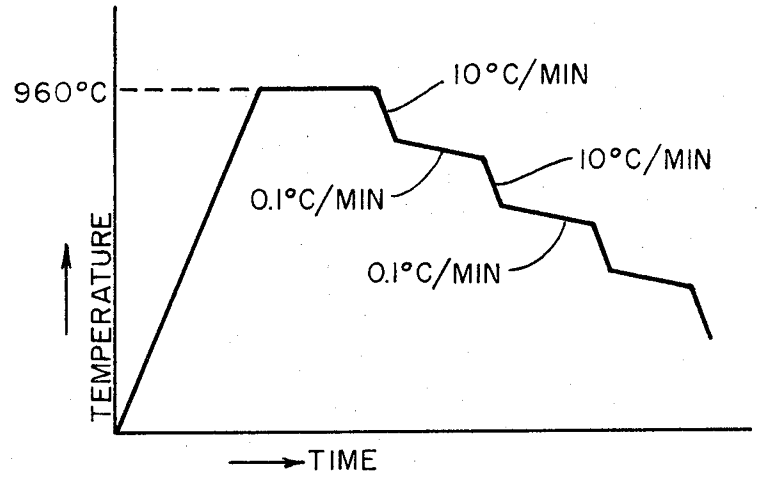
FIG. 5 is a program chart of the furnace temperature of another example of this invention.

FIG. 5 shows a temperature program for making multilayer semiconductor devices. As understood from the relationship in FIG. 2, it is possible to make multi-layer semiconductor devices by repeating the increasing and decreasing of the cooling rate during only one growth process. If the temperature is decreased at a cooling rate of 10° C./min. for 6 seconds, the Si doped N-type GaAs crystal precipitates on the GaAs substrate. If then the cooling speed is brought down at a rate of 0.1° C./min. for 2 minutes, the Si doped P-type GaAs crystal precipitates. Next, the cooling speed returns to the initial rate of 10° C./min. for 6 seconds to grow an N-type layer. The multi-layered semiconductor of NPNP construction can be obtained by repeating the same operations; changing alternately the cooling speed between the rates of 10° C./min. and 0.1° C./min. Thirteen or more layered semiconductors can be obtained. Thus, a multi-layer semiconductor can be obtained by the use of only one dopant and only one temperature operation.

As described hereinbefore, this invention utilizes the fact that the transition temperature varies according to the rate of temperature decrease and, therefore, the growth of P-type and N-type layers is controlled by the temperature and the temperature decrease rate, whereas according to the conventional liquid phase epitaxial growth process, the growth of P-type and N-type layers was controlled solely by the temperautre alone in keeping a given cooling speed during the growth process. For this reason, as shown in the above drawings, according to this invention, P-type and N-type layers of selected predetermined desired thickness may be grown on the selected substrate.

Figure 6:
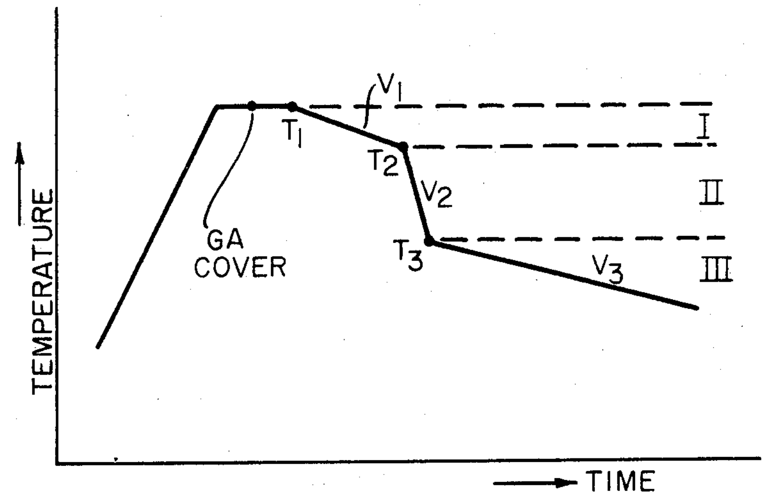
FIG. 6 is a program chart of the furnace temperature of applied examples of this invention.
Figure 7:
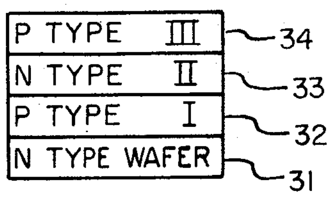
FIG. 7 is a model drawing showing the layers grown by the method as shown in FIG. 6.

An example of the method of making a negative resistance light emitting diode of PNPN construction is described. FIG. 6 shows the temperature program for making this type of diode. Only Si is used as an impurity. The three PNP layers may be formed on the N-type substrate in a single process by liquid phase epitaxial growth. In this example, Si doped N-type GaAs single crystal (free electron concentration thereof; about $6\times10^{17}/cm.^3$) 31 is used as a substrate. A melt consisting of 10 g. of Ga, 3.0 g. of GaAs and 20 mg. of Si at temperature $t_1$ of 960° C. covers the substrate surface [111]A and then cooling takes place according to the cycle shown in FIG. 6. The temperatures are: $t_1$=960° C., $t_2$=958° C., $t_3$=954° C., and the rates are $v_1$=0.2° C./min., $v_2$=10° C./min., and $v_3$=0.2° C./min. The first region P-type layer 32 is grown with a thickness of about 5 microns, in the second region the N-type layer 33 has a thickness of about 5 microns, and in the last region P-type layer 34 has a thickness of between 150 and 180 microns. FIG. 7 shows the layers grown by the above method. Contacts (not shown) are made to the N-type substrate 31 and the third growth layer 34 by alloying thereto an electrode material.

The Si-doped GaAs negative resistance light emitting diodes grown according to the above process are characteristically excellent in quantum efficiency of light emission, about ten times that of conventional diodes, and accordingly operate satisfactorily even at room temperature. Furthermore, the thickness of the first and second growth layers may be between 1 and 40 microns and is identical with a diffusion length of minority carrier in GaAs. The above method gives the gratifying result that the thickness of the medial layers is identical with the diffusion length so that the diodes provided have negative resistance characteristics. A copending application Ser. No. 45,299, filed June 11, 1970, in the names of Junichiro Shigemasa, Takeshi Sakurai and Zenpei Tani, and entitled "Method of Making Light Emitting Four Layer Semiconductor Device" discloses circuits embodying such devices.

The above mentioned method can apply directly to manufacture of NPN type GaAs transistors. The second cool rate $v_2$ is maintained rather than again changing. It is, therefore, possible to obtain NPN type transistors having good high frequency characteristics.

Figure 8A:
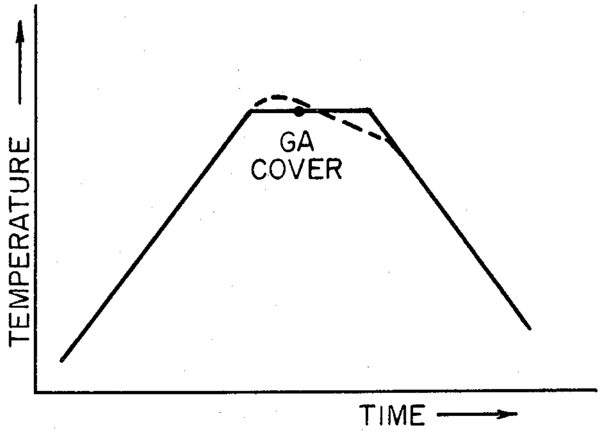
FIG. 8 is a program chart of the furnace temperature of another applied example of this invention.

In the case of making a conventional light emitting diode not having negative resistance characteristics, it is only necessary to grow an N-type layer and a P-type layer on the wafer. FIG. 8A shows a temperature program, in which a simple temperature slope exists, for making a light emitting diode of this type. However, although a temperature controlling system operates with accuracy, in fact the temperature controlling becomes rounded with an unexpected result.

An actual temperature curve of the furnace has a rightward slowly falling tendency even when the maximum temperature is held. That is, this means that the temperature is decreased at an extremely slow cooling rate.

Figure 8B:
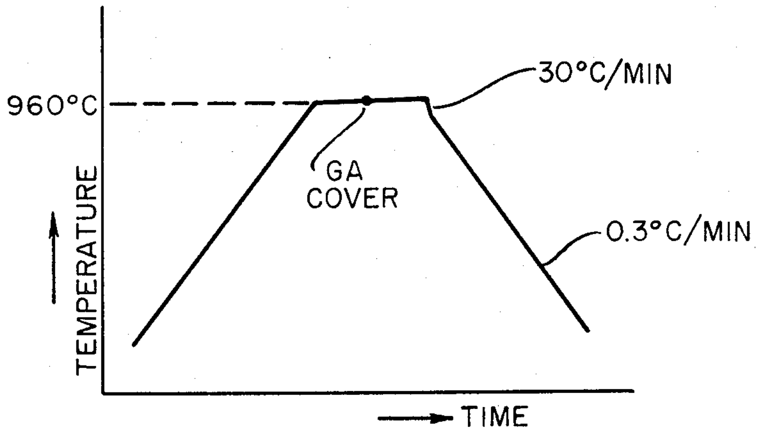
Figure 9:
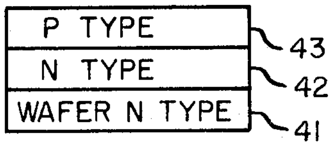
FIG. 9 is a model drawing showing the layers grown by the method as shown in FIG. 8.

An undesirable P-type layer is, therefore, apt to grow, as understood from the relationship in FIG. 2, and this is not proper for making the above type diodes differing from a case of the negative resistance light emitting diodes. It is possible to avoid this disadvantage by utilizing the relationship shown in FIG. 2 and controlling the furnace temperature according to the program shown in FIG. 8B. The furnace is heated to a maximum temperature, say 960° C., and the Ga melt is allowed to flow over the substrate. The furnace temperature is further increased by degrees and then decreased at an extremely rapid speed, say 30° C./min. There is no possibility of growing a P-type layer at this rate. Subsequently, when the cooling speed changes to the low rate of 0.3° C./min., an N-type layer grows first and then a P-type layer grows. FIG. 9 shows a state of layers grown by the above method. The substrate 41 is of N-type, the first growth layer 42 is of N-type, and the second growth layer 43 is of P-type. This diode represents high efficiency of light emission at the P-N junction between the growth layers 42 and 43.

The semiconductors of intermetallic compounds of Groups III–IV other than GaAs considered useful in the practice of the present invention are GaP, InP, GaSb, GaN, AlSb, AlAs, [GaAs]Al, Ga[AsP] and [GaAl]P and the amphoteric impurities other than Si considered useful in the practice of the present invention are Ge and Sn.

This invention may be applied to making of P-N junctions of the above semiconductors with the above amphoteric impurities. Although the description of this invention has been made with a certain degree of particularity, it is understood that the present disclosure has been made only by way of example and that numerous changes in the details of construction and the combination and arrangement of the parts and elements may be resorted to without departing from the spirit and scope of this invention.

We claim:

1. A method of making a P-N junction device using liquid phase epitaxial growth with a semiconductor melt including an amphoteric impurity in which the growth layers are semiconductor compounds of Groups III–V and the amphoteric impurity acts as either an N-type impurity or a P-type impurity for the semiconductor compounds which includes the step of changing the rate of temperature decrease during cooling of the melt so that P-type layer and N-type layer grow successively to form a P-N junction between the P-type and N-type layers.

2. A method according to claim 1 in which the semiconductor compounds consist of GaAs and the amphoteric impurity consists of Si.

3. A method according to claim 1 and comprising a step of cooling said melt at a slow rate to grow a P-type layer and a step of cooling said melt at a rapid rate to grow an N-type layer.

4. A method according to claim 1 in which the rate of temperature decrease is changed within the range of about 0.1–10° C./min.

5. A method according to claim 1 in which the melt is contained in an electrically heated furnace and wherein the cooling rate is controlled by controlling the electrical power applied to the furnace.

6. A method of making a 4-layer semiconductor device using liquid phase epitaxial growth with a melt including an amphoteric impurity in which the growth layers are semiconductor compounds of Groups III–V and the amphoteric impurity acts as either an N-type impurity or a P-type impurity for the semiconductor compounds which includes the first step of preparing an N-type layer, the second step of cooling the melt at a slow rate to grow a P-type layer, the third step of cooling the melt at a rapid rate to grow an N-type layer and the fourth step of cooling the melt to grow another P-type layer thereby forming PNP layers on the N-type layer to define three junctions.

7. A method according to claim 6 in which the substrate and the three growth layers are semiconductors of compounds having high band gap energy whereby the semiconductor device consisting of the substrate and the three layers provides a negative resistance light-emitting diode.

8. A method according to claim 6 in which said second and third steps the thickness of the two intermediate layers is made approximately identical with the diffusion length of the minority carriers in the semiconductor material whereby a negative resistance device characteristic is provided.

9. A method of forming a 3-layer semiconductor device using liquid phase epitaxial growth with a melt including an amphoteric impurity in which the growth layers are semiconductor compounds of Groups III–V and the amphoteric impurity acts as either an N-type impurity or a P-type impurity for the semiconductor compounds which includes the first step of preparing an N-type substrate, the second step of cooling the melt at a rapid rate to avoid the possibility of growing a P-type layer and to grow an N-type layer and the third step of cooling the melt at a slow rate to grow a P-type layer whereby forming N-type and P-type layers on the N-type substrate.

References Cited

UNITED STATES PATENTS

| | | | |
|---|---|---|---|
| 3,266,952 | 8/1966 | McCaldin | 148—171 |
| 3,560,275 | 2/1971 | Kressel et al. | 148—171 |

ROBERT D. EDMONDS, Primary Examiner